United States Patent [19]

Yu

[11] Patent Number: 4,489,276
[45] Date of Patent: Dec. 18, 1984

[54] DUAL-CONE DOUBLE-HELICAL DOWNHOLE LOGGING DEVICE

[75] Inventor: Jiunn S. Yu, Albuquerque, N. Mex.

[73] Assignee: The United States of America as represented by the United States Department of Energy, Washington, D.C.

[21] Appl. No.: 341,021

[22] Filed: Jan. 20, 1982

[51] Int. Cl.³ .......................... G01V 3/30; H01Q 1/36
[52] U.S. Cl. .................................... 324/338; 343/895
[58] Field of Search .............. 324/338, 339, 340, 341, 324/342; 343/895

[56] References Cited

U.S. PATENT DOCUMENTS

| 3,188,643 | 6/1965 | Dyson et al. | 343/895 |
|---|---|---|---|
| 3,449,657 | 6/1969 | Fredriksson et al. | |
| 3,633,210 | 1/1972 | Westerman et al. | 343/895 |
| 3,891,916 | 6/1975 | Meador | |
| 3,893,020 | 7/1975 | Meador | |
| 3,893,021 | 7/1975 | Meador | |
| 3,982,176 | 9/1976 | Meador | |
| 3,993,944 | 11/1976 | Meador | |
| 4,009,434 | 2/1977 | McKinlay | |
| 4,012,689 | 3/1977 | Cox et al. | |
| 4,100,483 | 7/1978 | Thompson | 324/85 X |
| 4,107,598 | 8/1978 | Meador | 324/85 X |
| 4,130,793 | 12/1978 | Bridges | |
| 4,278,941 | 6/1981 | Freeman | 324/341 |

Primary Examiner—Gerard R. Strecker
Assistant Examiner—Walter E. Snow
Attorney, Agent, or Firm—George H. Libman; Albert Sopp

[57] ABSTRACT

A broadband downhole logging device includes a double-helix coil wrapped over a dielectric support and surrounded by a dielectric shield. The device may also include a second coil longitudinally aligned with a first coil and enclosed within the same shield for measuring magnetic permeability of downhole formations and six additional coils for accurately determining downhole parameters.

6 Claims, 4 Drawing Figures

DUAL-CONE DOUBLE-HELICAL DOWNHOLE LOGGING DEVICE

The U.S. Government has rights in this invention pursuant to Contract No. DE-AC04-76DP00789 between the Department of Energy and Sandia Corporation.

BACKGROUND OF THE INVENTION

The present invention relates generally to a refractive-index logging device and more particularly to a downhole refractive-index logging device for evaluating gas or oil-bearing strata.

Since most of the known gas and oil remaining in the earth is in tight reservoirs (i.e., the product cannot be easily removed without enhanced recovery techniques), these tight reservoirs have become a major target for gas and oil supplies to meet present and future needs.

Exploration, development, and production of natural gas and oil are known to be more effective and less costly when quantitative evaluations of earth formations are accurate. However, the production parameters (porosity, saturation, permeability, etc.) of tight reservoirs are difficult to resolve. Therefore, accurate logging tools with high-resolution capability are needed for their cost-effective production.

For the past three decades induction and dielectric logging tools have been used to evaluate some properties of earth formation around a borehole. The immediate function of these logs is to determine the electrical parameters (conductivity and dielectric constant) of formations when downhole probe responses are obtained in terms of volts and amperes. Their principle of operation is that gas and oil bearing formations have smaller electric conductivity and dielectric constant than formations saturated by underground water. However, measurements with these logs in tight reservoirs result in various ambiguity problems such as contradictory, erroneous, or unresolvable measurements because the composition and structure of formation materials in tight reservoirs is much more complex than in conventional wells. Accordingly, logging tools capable of interrogating more comprehensive parameters are needed to provide more accurate resolutions.

One system for radio frequency dielectric induction well logging is shown in U.S. Pat. No. 4,012,689 of Percy Cox et al. This patent discloses a 30 MHz transmitting antenna and a plurality of receiving antennas spaced along a downhole logging device, each antenna comprising a single coil of electrostatically shielded wire. The purpose of the shielding is to suppress undesirable electromagnetic modes induced at the feed terminal of each antenna. However, the shielding introduces additional coupling modes which also affect the usefulness of the resulting measurements. Cox calculates his results from the theory of a point source oscillating magnetic dipole, assuming a constant magnetic permeability $\mu$.

U.S. Pat. No. 4,278,941 of Robert Freeman solves some of the problems caused by borehole mud and invasion effects through the use of four simple (i.e., conventional loop) receiving coils. However, the simple coils of this patent must be tuned to each frequency and do not permit multiple-frequency, swept CW or broadband pulse operation permitted by a conical double-helix antenna. In addition, the patent fails to provide for logging-mode purity through the use of a unique connection (i.e., balanced center-feed terminal) between the coaxial cable and the antenna. Finally, the patent does not provide for the evaluation of magnetic permeability, requiring users of the patented technique to assume a value and hope that the actual value of permeability equaled the assumed value.

U.S. Pat. No. 3,449,657 of Oke A. Fredriksson et al. discloses a helical antenna for irradiating a salt formation in the earth with electromagnetic energy in a plane transverse to the axis of a borehole to explore for oil reservoirs around a salt dome. The antenna consists of a cylindrical conductive tube having conductors spaced from the tube by insulating posts. The conductors emanate from a central location along the tube with two codirectional conductors spiraling towards each end position. (Codirectional windings are each wound in the same direction such that they do not cross each other.) The conductors are connected to a coaxial cable by a duplexer coupler, enabling the antenna to be used for transmitting and receiving. The 15 foot long antenna is used as a logging tool in arid salt formations, where it excites a travelling-wave mode with a narrow beam to determine the distance to electromagnetic discontinuities. This antenna would be useless in the wet environment of a tight reservoir which requires a magnetic-dipole mode in a broad beam to determine the refractive indices of formation surrounding a borehole.

SUMMARY OF THE INVENTION

It is an object of this invention to provide an antenna arrangement to enable accurate measurement of the magnetic permeability of earth formations.

It is also an object of this invention to provide a refractive-index logging tool for evaluating the electromagnetic parameters of earth formations.

It is another object of this invention to provide a center-feed double-helix coil having counter-directional windings to maintain the requisite logging-mode purity for refractive-index evaluations.

It is still another object of this invention to provide a balanced conical antenna for multi-frequency, swept-CW or broadband pulse operations required for unique evaluation of dispersive formation parameters.

It is still another object of this invention to provide a high resolution coil array of a transmitting coil and six receiving coils to enable self-consistency checks for evaluating tight gas and oil bearing strata.

Additional objects, advantages and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the downhole logging device of this invention may comprise a first double-helix coil wound over an elongate dielectric supporting structure and a hollow dielectric housing enclosing the coil to protect it from the severe downhole environment. In a preferred embodiment of the invention, the dielectric supporting structure and the coil taper from a first larger diameter at each end to a second smaller diameter at the center, thereby making the structure suitable for broadband operation. The downhole logging device may also preferably include a second double-helix coil longitudinally spaced from the first coil to provide for an accurate measurement of the magnetic permeability of earth formations, and six other receiving coils uniformly spaced from the first coil to provide for self-consistent measurement of downhole parameters.

BRIEF DESCRIPTION OF THE DRAWINGS

The accompanying drawings, which are incorporated in and form a part of the specification, illustrate an embodiment of the present invention and, together with the description, serve to explain the principles of the invention.

DETAILED DESCRIPTION OF THE INVENTION

Figure 1:
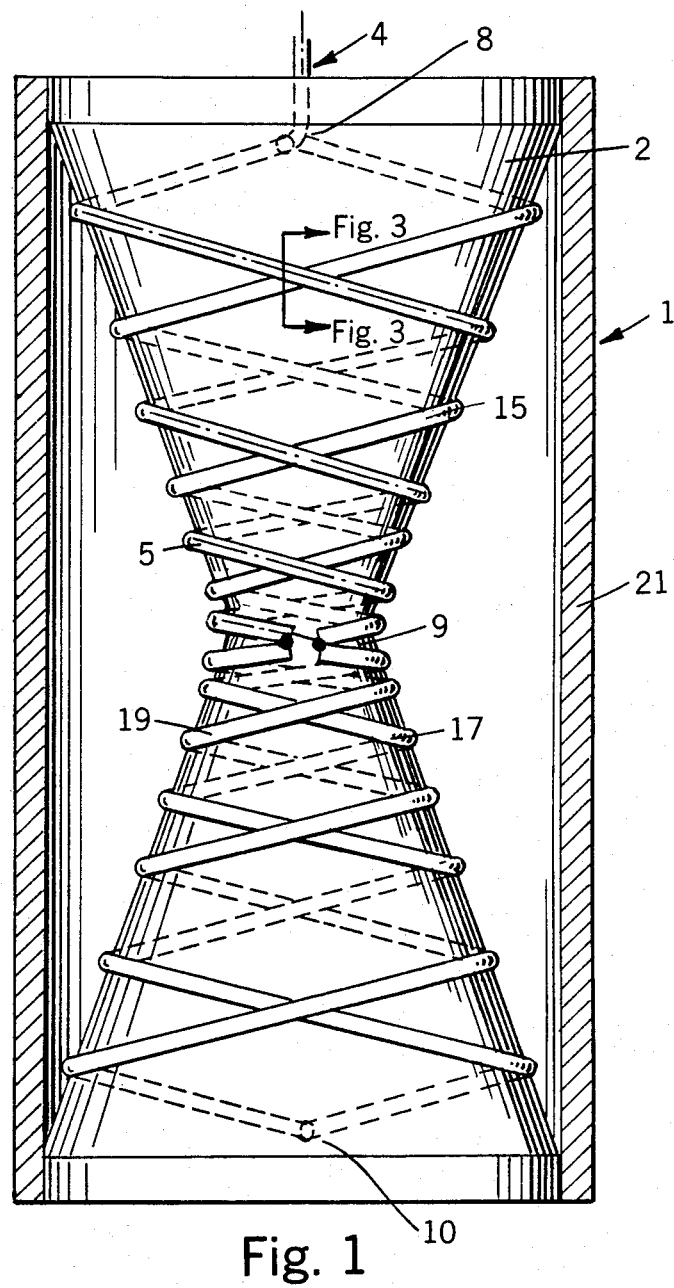
FIG. 1 shows a partial-sectional view of a double-helix coil.

As shown in the preferred embodiment of the invention illustrated in the figures, the downhole logging device 1 includes a double-helix coil having a dielectric coil support 2, a plurality of conductors 4, 15, 17, 19, insulator 16 and housing 21. The device is suspended down a borehole by conventional means (not shown).

Figure 3:
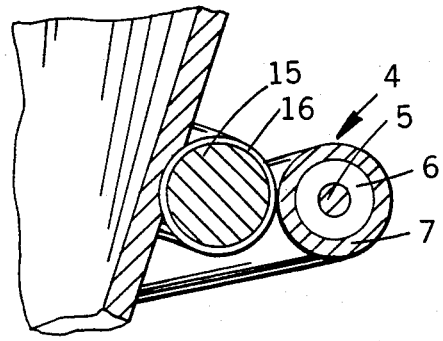
FIG. 3 is a sectional view of a portion of FIG. 1 showing the insulation between crossing coils.

The dielectric coil support is an elongate structure of regular cross section. As shown in FIG. 1, in the preferred embodiment coil support 2 has a larger diameter at end portions 8, 10 and a smaller diameter at center portion 9. However, it is contemplated that a cylinder of constant diameter may also be used in this invention, provided the pitch angle of the windings is designed for broadband operation. As shown in FIG. 3, the coil support is preferably hollow, allowing the passage of electrical power and communication cables down the hole.

An electrical signal is either fed to the device (when it is used as a transmitter) or taken from the device (when it is used as a receiver) through coaxial cable 4 which includes center conductor 5, insulator 6 and outer conductor 7. Cable 4 passes through the wall of dielectric coil support 2 at first end position 8 and is helically wound around support 2 in one direction for a number of turns having a constant pitch angle to center position 9.

Conductors 15 and 17 also extend from center position 9 to first and second end positions 8 and 10, respectively, along dielectric coil support 2. In the preferred embodiment, the length of conductors 15, 17 is equal to the length of coaxial cable 4 from first end position 8 to center position 9. One end of conductor 15 is electrically connected to the end of center conductor 5 at center position 9 and the remainder of conductor 15 is wound in the direction opposite the winding of cable 4 around dielectric support 2 with a constant pitch angle to a location adjacent outer conductor 7 at first end position 8. One end of conductor 17 is also connected to center conductor 5 at center position 9, and the remainder of conductor 17 is evenly wound in the same direction and at the same pitch angle as cable 4 along dielectric support 2 to a second end position 10, the longitudinal spacing between first end position 2 and center position 9 being approximately equal to the longitudinal spacing between center position 9 and second end position 10. In addition, one end of third conductor 19 is conductively connected to outer conductor 7 at center position 9, and the remainder of third conductor 19 is wound around support 2 in the opposite direction as cable 4 to a termination adjacent the end of second conductor 17 at second position 10.

Any conventional technique such as grooves, pins, adhesive, etc., may be used to retain the conductors at the desired position on coil support 2.

Figure 2:
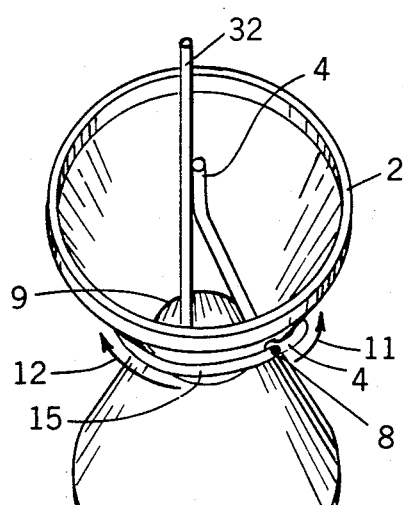
FIG. 2 is a top view of the device of FIG. 1 showing the possible helix directions.

The conductor directions discussed above are illustrated in FIG. 2, which shows a top view of the device of FIG. 1. With cable 4 extending into the page, counter-clockwise direction 11 is arbitrarily defined as one direction while clockwise direction 12 is defined as the opposite direction. When viewed from the top, as illustrated, cables 15 and 19 are wound clockwise, the opposite direction from cables 4 and 17. Of course, coaxial cable 4 may be wound in either direction, as long as the relationship between cable 4 and conductors 15, 17, and 19 is maintained.

For the proper operation of this device, it is imperative that the various conductors only touch one another at their ends. Accordingly, in the preferred embodiment each of conductors 15, 17, and 19 is coated in a conventional manner with an insulative film 16. As shown in FIG. 3, this film prevents conductor 15 from shorting to outer conductor 7 when the conductors cross each other. Of course, other equivalent insulative means may be used. For instance, if conductors 15 and 17 are applied directly to dielectric support 2, a thin insulative film may be wrapped around them, and cable 4 and conductor 19 wound over the film.

Although the end of conductor 15 is illustrated as being connected to outer conductor 7 at first end position 8, and the ends of conductors 17 and 19 are shown as being connected at second end position 10, it is to be understood that these respective connections may be replaced by tuning elements, such as a capacitor, an inductor or a conjugate matched-load impedance depending on the logging requirements of the antenna.

Because of the particular winding arrangement described herein, the current flow through all four windings of the double-helix antenna is always in the same direction, enabling the antenna to couple the magnetic-dipole mode to and from the downhole formation.

As shown in FIG. 1, the device of this invention also includes a dielectric housing 21 enclosing the double-helix coil and protecting it from the harsh environment under which this device is to be operated. Housing 21 may typically be formed of a strong thermoplastic polyacrylate to provide the necessary protection without undesirable electrical effects on the operation of the invention.

Figure 4:
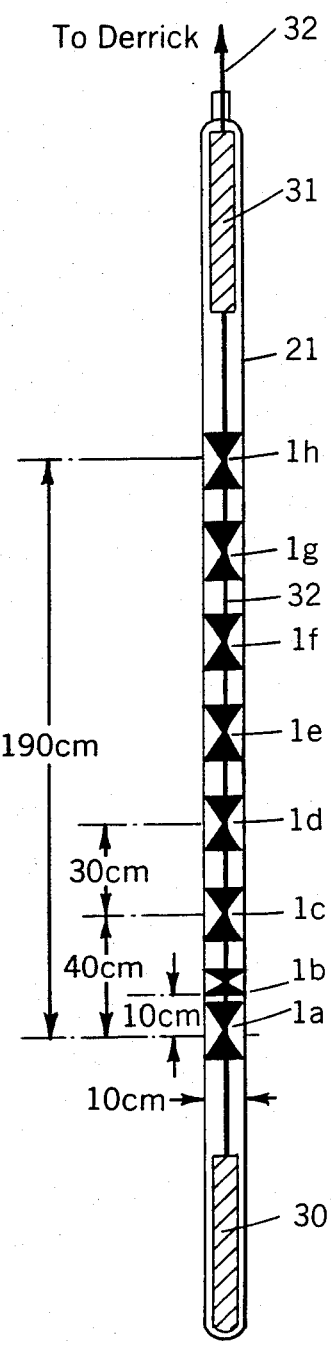
FIG. 4 is a downhole logging device having a proximity coil and six other receiving coils adjacent a transmitting double-helix coil.

FIG. 4 shows a perferred embodiment of the logging device of this invention where eight double-helix coils are aligned along the same longitudinal axis. The lower transmitting coil 1a is identical to the coil of FIG. 1. The upper six receiving coils 1c-1h are identical to the lower transmitting coil.

Proximity coil 1b is positioned adjacent transmitting coil 1a. It is also similar to coil 1a but with only one or two turns. The sensitivity of each coil is dependent on the number of its turns; accordingly, the number of turns on each receiving coil may be increased to compensate for its increased distance from transmitting coil 1a.

Also shown in FIG. 4 are transmitter 30 positioned at the bottom of the sonde, receiver 31 from which the coils 1a to 1h are electrically connected, and cable 32 which comprises suspension cables and electrical cables for the downhole logging. Dielectric housing 21 encloses all components of the device.

In a typical embodiment, the diameter of dielectric coil support 2 at ends 8 and 10 is approximately ten centimeters (four inches) and approximately 2.5 cm (1 inch) at center 9. The overall length of coil support 2 is approximately 20 centimeters (8 inches) and approximately 3½ turns of each conductor are wrapped from the end position to the center position around coil support 2. The outer diameter of coaxial cable 4 and conductors 15, 17, 19 may be approximately 3 mm. An antenna of this configuration operates well over a frequency range of 10 to 100 MHz. In the arrangement of FIG. 4, the spacing from the center of transmitting coil 1a to proximity coil 1b is approximately 10 cm (4 inches), the spacing to the center of coil 1c is approximately 40 cm (16 inches), and the spacing between the centers of adjacent receiving coils is approximately 30 cm (1 foot).

In the operation of this invention, transmitter 30 is actuated by command signals from the surface to generate a signal that may be multiple frequencies between 10 and 100 MHz, swept-CW or repetitively pulsed, depending upon logging requirements. This signal is carried by coaxial cable 4 to conductors 15, 17 and 19 of transmitting coil 1a where it is radiated into the earth formation surrounding the borehole in a pattern characteristic of a magnetic dipole. The signal passes through the mud in the borehole to interact first with the earth formation that has been invaded by the drilling mud and then with the virgin, or uninvaded, formation. The signal is scattered by interactions with the soil and mud, creating secondary signals which are picked up by the narrow band proximity coil 1b and by the wide band double-helix coils 1c–1h. These signals have different magnitudes and phase angles which may be measured by the receiver and used to compute the refractive indices of the invaded and uninvaded earth formations.

Although much of the computations are well known to and used by those skilled in this art, the proximity coil 1b and the use of six receiving antennas 1c–1h enable this invention to provide information and accuracy about downhole formations previously unattainable by logging techniques. The theory of these improvements is discussed in part in an article by the inventor in "IEEE Transactions on Antennas and Propagation," Vol. AP-29, No. 2, March 1981, pp. 408–412. In particular, they relate to self-consistency between logging theory and the measurements, and to determination of earth magnetic permeability.

The transmitted and received signals are used to calculate $Z_{11}$, the self-impedance of the transmitting coil, and $Z_{21}$, the transfer impedance at a receiving coil. In the past these values are used to analyze borehole formations under the assumptions that the magnetic permeability downhole is the same as the magnetic permeability of air, and that the coils support only magnetic-dipole interactions. By the use of proximity coil 1b, users of this invention may determine the actual value of magnetic permeability downhole. In addition, the use of six other receiving antennas provides sufficient information that six values of $Z_{21}$ may be used for the calculations to yield self-consistent evaluations on refractive indicies of multiple-zone formation. These calculations enable the invention to be used by those of ordinary skill in the art to more accurately determine the presence of commercially obtainable supplies of downhole gas or oil.

The particular sizes and equipment discussed above are cited merely to illustrate a particular embodiment of the invention. It is contemplated that the use of this invention may involve components having different sizes as long as the principle described herein is followed. Device so constructed will provide a sensitive, broadband logging signal suitable for accurately measuring the electro-magnetic parameters of strata underground.

I claim:

1. A downhole refractive index logging device comprising: a first double-helix coil comprising: elongate dielectric means for supporting a coil;

said coil consisting of a coaxial cable having a center conductor and an outer conductor extending in one direction helically around said dielectric means from a first end position to a center position, an end of said cable being at the center position; a first conductor connected at one end to the end of said center conductor and extending in an opposite direction helically around said dielectric means from the center position to the first end position, said first conductor overlapping said cable twice during each turn of said first conductor around said dielectric means, the other end of said first conductor being adjacent said outer conductor; a second conductor connected at one end to the end of center conductor and extending in the one direction helically around said dielectric means from the center position to a second end position; and a third conductor connected at one end to the end of said outer conductor and extending in the opposite direction helically around said dielectric means from the center position to the second end position, said second conductor overlapping said third conductor twice during each turn of said second conductor around said dielectric means, the other end of said third conductor being adjacent the other end of said second conductor;

insulating means for preventing electrical contact between overlapping electrical conductors; and a hollow dielectric housing means for enclosing and protecting the coil from a downhole environment.

2. The device of claim 1 wherein said dielectric means tapers from a first larger diameter at the first and second end positions to a second smaller diameter at the center position.

3. The device of claim 2 wherein said dielectric means has a hollow interior.

4. The device of claim 3 including six additional evenly spaced tapered double-helix coils axially aligned with said first coil and enclosed by said housing, said first coil being a transmitting antenna and said six additional coils being receiving coils.

5. The device of claim 4 including a proximity coil comprising a second double-helix coil enclosed by said housing, said second coil being longitudinally spaced from said first coil with the second end of said second coil being adjacent the first end of said coil.

6. The device of claim 4 including a receiver axially aligned with and mounted upstream from said receiving coils, the coaxial cable from each receiving coil passing through the hollow interior of each upstream coil to said receiver.

* * * * *